Dec. 12, 1939.　　　R. H. VAN SAUN　　　2,183,177
INTERIOR PACKING DEVICE
Filed May 26, 1939
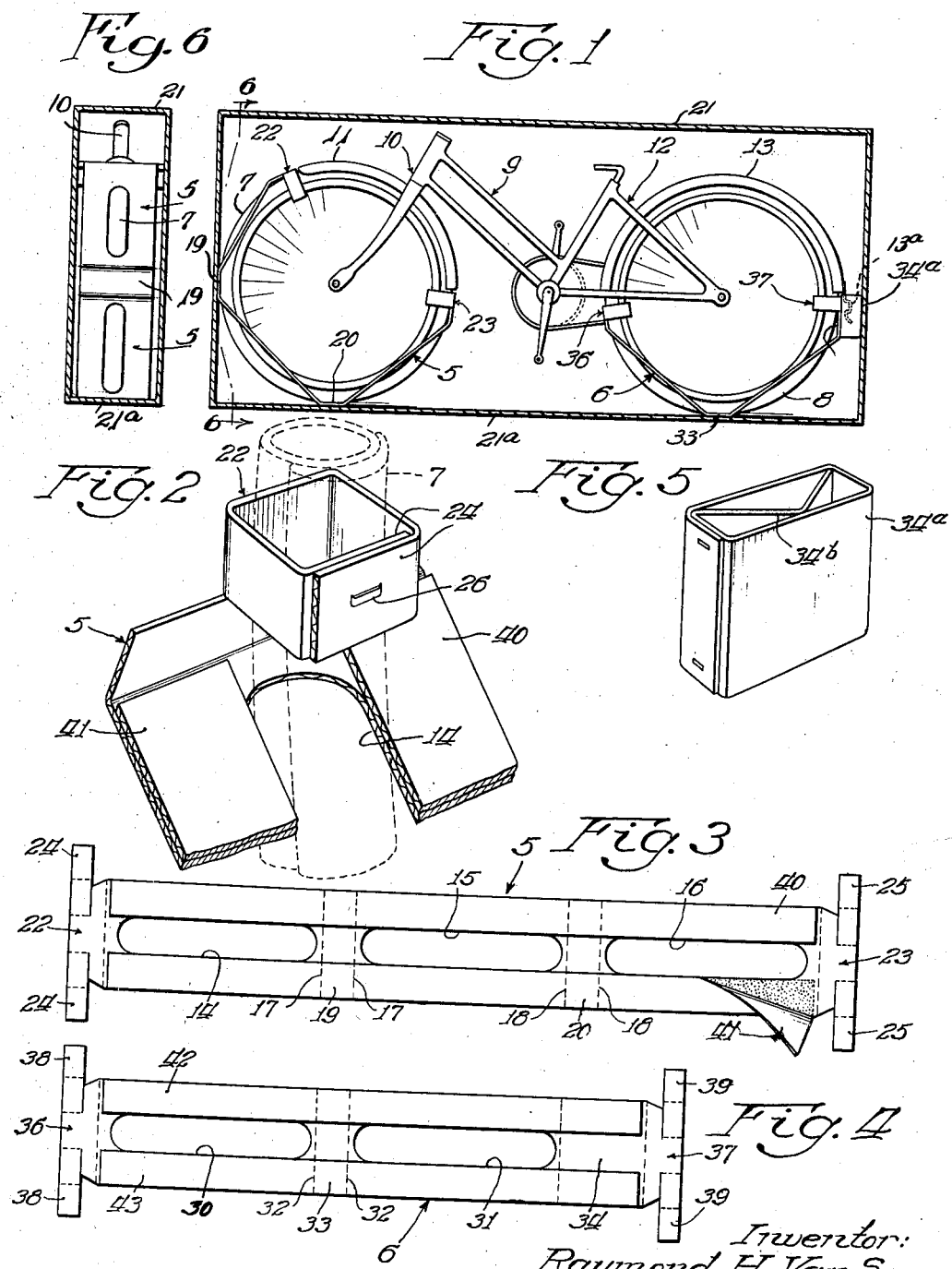
Inventor:
Raymond H. VanSaun
By: E. A. Wagonseller
Atty.

Patented Dec. 12, 1939

2,183,177

UNITED STATES PATENT OFFICE 2,183,177

INTERIOR PACKING DEVICE

Raymond H. Van Saun, Chicago, Ill., assignor to Container Corporation of America, Chicago, Ill., a corporation of Delaware

REISSUED

Application May 26, 1939, Serial No. 275,779

7 Claims. (Cl. 206—46)

The present invention relates to interior packing or bracing devices and is more particularly concerned with devices for retaining partly assembled bicycles in a shipping container.

Objects of the invention are to provide an efficient, inexpensive interior packing for bicycles and similar wheeled articles, the interior packing being so constructed as to be readily applied and removed and being adapted to afford a maximum amount of protection to the bicycle with a minimum of material employed.

Another object of the invention is to provide an interior packing device which may be fixedly associated with a wheel of a bicycle after same has been assembled onto the frame, whereby the interior packing device may be applied in proper relation to the bicycle prior to its assembly within its enclosing container.

A further object of the invention is to provide an interior packing device capable of use without alteration on bicycles of varying wheel diameters.

Other objects will become apparent as the description proceeds.

In the drawing:

Fig. 1 is a side elevation of a partially assembled bicycle having applied to each wheel an interior packing device made in accordance with the present invention;

Fig. 2 is a fragmentary detail perspective view illustrating the association of an end of the interior packing device with a wheel of the bicycle;

Fig. 3 is a plan view of an interior packing device particularly adapted for the front wheel of a conventional bicycle;

Fig. 4 is a view similar to Fig. 3, showing the device as adapted for the rear wheel; and Fig. 5 is a perspective view of a spacing element for use in cooperation with one of the interior packing devices.

Fig. 6 is a section taken on line 6—6 of Fig. 1 looking in the direction of the arrows.

The construction of the present invention finds advantageous use in the shipment of partly assembled bicycles such as those having the front and rear wheels assembled on the frame but with the seat, handle bar and pedals unassembled therewith. In the shipment of bicycles so assembled it is important to retain the wheel perimeters, comprising rim and tire, from shifting movement, as any appreciable movement of the tire for a considerable period of time during transportation is likely to produce a worn area which may render the tire unsaleable.

Referring more particularly to the drawing, there is shown at 5 and 6, forms of interior packing devices for the respective front and rear wheels 7 and 8 of a bicycle indicated as a whole at 9. The bicycle illustrated is of more or less conventional form and comprises a front wheel frame section 10 with mud guard 11 and a rear wheel frame section 12 with rear mud guard 13. The rear mud guard is illustrated as having a stand latch or bracket 13a secured thereto.

The interior packing devices are similar in construction with the exception that the device 5 for the front wheel is preferably made somewhat longer than the rear wheel device 6 for the reason that the mud guard 11 for the front wheel is usually constructed to extend over less of the wheel circumference than does the rear wheel mud guard and it is desirable to so construct the interior packing devices as to extend over substantially the entire free circumferential portion of each wheel.

The interior packing devices 5 and 6 are formed of any suitable bendable sheet material, being preferably formed of paperboard such as corrugated board. The device 5 is in the form of an elongated strip of sheet material and, in the present instance, is provided with three aligned, elongated apertures 14, 15 and 16 suitably spaced and formed with curved ends whereby each aperture may snugly engage the tire and rim portion of the wheel. Fold lines 17, 17 and 18, 18 are formed by suitably scoring the strip between adjacent apertures. The strip may thus readily be bent into the form illustrated in Fig. 1 to engage the front wheel at a plurality of points. The parts 19 and 20, lying between the respective pairs of fold lines 17, 17 and 18, 18 provide supporting surfaces, one of which (portion 20 as illustrated in Fig. 1) is arranged to be positioned at the lowermost point on the front wheel to keep the tire spaced from its underlying supporting surface such as the bottom wall 21a of a container 21 in which the bicycle is packed.

Means are preferably provided for fixedly engaging the interior packing device to the wheel at one or more points. For this purpose the strip 5 is preferably provided with extended portions 22 and 23 at its ends which are provided with laterally extended wings 24, 24 and 25, 25, suitably scored and of proper length so as to enable the ends of the wings to be brought around on the inner face of the rim and secured in any desired manner, as by means of a staple, illustrated at 26 in Fig. 2. The laterally extended wings are made sufficiently narrow to enable them to pass in between the spokes of the wheel.

The rear wheel packing device 6 preferably has two apertures 30 and 31 with fold lines 32, 32 formed between the apertures to provide a portion 33 adapted to rest beneath the lowermost surface of the rear wheel. This device is provided with a relatively long extended portion 34 at the end which is preferably arranged to extend substantially vertically at the rearmost part of the wheel.

As in the case of the device 5 for the front wheel, the device 6 has additional extended portions 36 and 37 with lateral wing portions 38, 38 and 39, 39 to adapt the device to fixedly engage the wheels similar to the arrangement illustrated in Fig. 2.

A spacing element 34a is preferably employed to contact the portion 34 and to space the rear of the bicycle from its enclosing container 21. The spacing element 34a is preferably formed with diagonally positioned interior braces 34b to provide a triangular opening into which the stand bracket 13a on the rear mud guard can be received.

In the use of certain thicknesses of sheet material it is desirable to use reinforcing portions. In the present instance reinforcing portions 40 and 41 are provided on the device 5 and similar portions 42 and 43 are provided on the device 6.

These reenforcing portions are preferably in the form of extended edges on the strips 5 and 6 and are arranged to be folded inwardly to lie flat on the face of the strip. This may be best accomplished in the event corrugated board is used by forming a cut score extending through one liner sheet and the corrugated sheet but terminating at the remaining liner sheet whereby the extended edge portion may be bent over to lie quite close to the face of the strip. The edge portions on the reenforcing portions may be glued or otherwise secured to the faces of the strips 5 and 6. The width of the reenforcing portions is preferably equal to the distance from the edge of the apertures to the edge of the strips from which the devices 5 and 6 are formed.

The devices 5 and 6 are preferably supplied to the user in flat form as shown in Figs. 3 and 4. The user needs only to bend the strips along the fold lines between the apertures, then apply the strips to the individual wheels. With a strip in place the wings on the end extensions are folded around the tire and rim and secured as shown in Figs. 1 and 2. The assembly is then ready to be enclosed in a suitable shipping container such as disclosed in Figs. 1 and 6.

The width of the devices 5 and 6 is preferably such that their edges will snugly engage the opposite inside wall surfaces of the shipping container.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A bicycle package comprising a container, a bicycle frame within the container having at least one wheel assembled therein, and means for spacing the wheel from the container comprising an elongated strip of bendable sheet material having two or more spaced, aligned, elongated wheel-engaging apertures, said strip being provided with fold lines between adjacent apertures, whereby the strip may be bent to enable portions of the perimeter of the wheel to be engaged in each aperture.

2. An interior packing device for bicycles comprising an elongated strip of bendable sheet material having two or more spaced, aligned, elongated wheel-engaging apertures, said strip being provided with fold lines between adjacent apertures, whereby the strip may be bent to enable portions of the perimeter of the wheel to be engaged in each aperture, and means at one end of the strip arranged to encircle the tire and rim to retain the end of the strip in fixed engaging relation to the wheel.

3. An interior packing device for bicycles comprising an elongated strip of bendable sheet material having two or more spaced, aligned, elongated wheel-engaging apertures, said strip being provided with fold lines between adjacent apertures, whereby the strip may be bent to enable portions of the perimeter of the wheel to be engaged in each aperture, and an extension at one end of the strip having laterally extending wing portions thereon arranged to encircle the wheel and rim to retain the end of the strip in fixed engaging relation to the wheel.

4. An interior packing device for bicycles comprising an elongated strip of bendable paper board having two or more spaced, aligned, elongated wheel-engaging apertures, said strip being provided with fold lines between adjacent apertures, whereby the strip may be bent to enable portions of the perimeter of the wheel to be engaged in each aperture, and reinforcing strips secured to the edges of the apertured strip in edgewise relation to the sides of the wheel.

5. A bicycle package comprising a container including a bottom wall and a bicycle frame in the container having at least one wheel assembled thereon, means for spacing the wheel from the bottom wall of the container, said means comprising a strip of bendable sheet material formed with at least two spaced, aligned, apertures, each arranged to receive segments of the wheel, the portion of the strip between said apertures being disposed on the bottom wall of the outer container to shield the tire from said bottom wall.

6. A bicycle package comprising a container including a rear wall and a bicycle frame in the container having at least the rear wheel assembled thereon, the bicycle also having a rear mud guard with a stand supporting bracket thereon, an interior packing device comprising a strip of bendable material having an aperture therein arranged to receive a limited segment of the periphery of the rear wheel, means disposed at the end of the strip and in juxtaposition to the end of the rear mud guard for securing the strip in fixed relation to the wheel, said strip being formed to present a vertically extending portion at the rear of the wheel, and a tubular pad element adapted to encompass the stand bracket, said tubular element being adapted to contact the vertically extending portion on one side and the rear wall of the enclosing container on its opposite side so that stresses imparted to the container through its rear wall will be transmitted directly to the periphery of the rear wheel.

7. A bicycle package comprising a container, a bicycle frame within the container having at least one wheel assembled therein, and means for spacing the wheel from the container comprising an elongated strip of bendable sheet material having two or more spaced, aligned, elongated wheel-engaging apertures, said strip being provided with fold lines between adjacent apertures, whereby the strip may be bent to enable portions of the perimeter of the wheel to be engaged in each aperture, and means at one end of the strip adapted to be engaged in fixed relation to a portion of the bicycle to maintain the strip in fixed relation to the wheel.

RAYMOND H. VAN SAUN.